US007011919B2

(12) United States Patent
Molaire et al.

(10) Patent No.: US 7,011,919 B2
(45) Date of Patent: *Mar. 14, 2006

(54) SELF-DISPERSING TITANYL PHTHALOCYANINE PIGMENT COMPOSITIONS AND ELECTROPHOTOGRAPHIC CHARGE GENERATION LAYERS CONTAINING SAME

(75) Inventors: Michel F. Molaire, Rochester, NY (US); Louis J. Sorriero, Rochester, NY (US)

(73) Assignee: Eastman Kodak Company, Rochester, NY (US)

(*) Notice: Subject to any disclaimer, the term of this patent is extended or adjusted under 35 U.S.C. 154(b) by 144 days.

This patent is subject to a terminal disclaimer.

(21) Appl. No.: 10/655,528

(22) Filed: Sep. 4, 2003

(65) Prior Publication Data

US 2004/0161692 A1    Aug. 19, 2004

Related U.S. Application Data

(60) Provisional application No. 60/430,219, filed on Dec. 2, 2002.

(51) Int. Cl.
*G03G 15/06* (2006.01)

(52) U.S. Cl. .................... 430/78; 430/135; 430/59.4; 430/59.5; 106/412; 106/413

(58) Field of Classification Search ............... 430/78, 430/135, 59.4, 59.5; 106/412, 413
See application file for complete search history.

(56) References Cited

U.S. PATENT DOCUMENTS

| 3,589,924 | A | 6/1971 | Giambalvo et al. ..... 106/288 Q |
| 4,555,467 | A | 11/1985 | Hawegawa et al. ......... 430/110 |
| 4,701,396 | A | 10/1987 | Hung et al. ................... 430/58 |
| 4,785,999 | A | 11/1988 | Takijiri ........................ 241/26 |
| 4,882,427 | A | 11/1989 | Enokida et al. ............. 540/141 |
| 4,994,566 | A | 2/1991 | Mimura et al. ............. 540/141 |
| 5,008,173 | A | 4/1991 | Mimura et al. ................ 430/78 |
| 5,039,586 | A | 8/1991 | Itami et al. .................... 430/78 |
| 5,055,368 | A | 10/1991 | Nguyen et al. ................ 430/78 |
| 5,059,355 | A | 10/1991 | Ono et al. .................... 252/584 |
| 5,112,711 | A | 5/1992 | Nguyen et al. ................ 430/58 |
| 5,132,197 | A | 7/1992 | Iuchi et al. .................... 430/76 |
| 5,166,339 | A | 11/1992 | Duff et al. .................. 540/141 |
| 5,194,354 | A | 3/1993 | Takai et al. ................... 430/58 |
| 5,206,359 | A | 4/1993 | Mayo et al. ................. 540/141 |
| 5,238,764 | A | 8/1993 | Molaire et al. ............... 430/58 |
| 5,238,766 | A | 8/1993 | Molaire et al. ............... 430/78 |
| 5,523,189 | A | 6/1996 | Molaire ....................... 430/58 |
| 5,614,342 | A | 3/1997 | Molaire et al. ............... 430/78 |
| 5,629,418 | A | 5/1997 | Molaire et al. ............. 540/141 |
| 5,766,810 | A | 6/1998 | Molaire et al. ............... 430/78 |
| 5,773,181 | A | 6/1998 | Molaire et al. ............... 430/78 |
| 2004/0106055 | A1 * | 6/2004 | Molaire et al. ............... 430/78 |

* cited by examiner

*Primary Examiner*—Mark A. Chapman
(74) *Attorney, Agent, or Firm*—Carl F. Ruoff

(57) ABSTRACT

In a process for forming a self-dispersing crystalline phthalocyanine pigment composition of monodisperse nanoparticles, a mixture containing titanyl fluorophthalocyanines, unsubstituted titanyl phthalocyanine, and an organic monomeric dispersant but substantially free of organic solvents or inorganic salts is dry milled, thereby forming a substantially amorphous phthalocyanine pigment composition. The substantially amorphous composition is contacted with an organic solvent having a hydrogen bonding parameter gamma$_c$ lower than about 8, thereby forming a self-dispersing cocrystalline phthalocyanine pigment composition of monodisperse nanoparticles containing titanyl fluorophthalocyanines and titanyl phthalocyanine, which can be used to form the charge generation layer of an electrophotographic element.

17 Claims, No Drawings

SELF-DISPERSING TITANYL PHTHALOCYANINE PIGMENT COMPOSITIONS AND ELECTROPHOTOGRAPHIC CHARGE GENERATION LAYERS CONTAINING SAME

CROSS-REFERENCE TO RELATED APPLICATIONS

Reference is made to the following co-pending, commonly assigned applications, the disclosures of which are incorporated herein by reference:

U.S. Provisional Patent Application Ser. No. 60/430,219, filed Dec. 2, 2002, in the name of Molaire, entitled UNIFORM COCRYSTALS OF TITANYL FLUOROPHTHALOCYANINE AND TITANYL PHTHALOCYANINE FORMED IN TRICHLOROETHANE, AND CHARGE GENERATING LAYER CONTAINING SAME;

U.S. Provisional Patent Application Ser. No. 60/430,923, filed Dec. 4, 2002, in the names of Molaire, et al., entitled TWO-STAGE MILLING PROCESS FOR PREPARING COCRYSTALS OF TITANYL FLUOROPHTHALOCYANINE AND TITANYL PHTHALOCYANINE, AND ELECTROPHOTOGRAPHIC ELEMENT CONTAINING SAME;

U.S. Provisional Patent Application Ser. No. 60/430,779, filed Dec. 4, 2002, in the names of Molaire, et al., entitled COCRYSTALS CONTAINING HIGH-CHLORINE TITANYL PHTHALOCYANINE AND LOW CONCENTRATION OF TITANYL FLUOROPHTHALOCYANINE, AND ELECTROPHOTOGRAPHIC ELEMENT CONTAINING SAME;

U.S. Provisional Patent Application Ser. No. 60/430,777, filed Dec. 4, 2002, in the names of Molaire, et al., entitled PROCESS FOR FORMING COCRYSTALS CONTAINING CHLORINE-FREE TITANYL PHTHALOCYANINES AND LOW CONCENTRATION OF TITANYL FLUOROPHTHALOCYANINE USING ORGANIC MILLING AID.

FIELD OF THE INVENTION

The present invention relates to electrophotographic elements and related materials. More particularly, the invention relates to a process for forming amorphous titanyl phthalocyanine pigment, their conversion to self-dispersing crystalline pigment compositions of monodisperse nanoparticles comprising titanyl phthalocyanine and titanyl fluorophthalocyanines, and further to the inclusion of these compositions in the charge generation layers of electrophotographic elements.

BACKGROUND OF THE INVENTION

In electrophotography, an image having a pattern of electrostatic potential, also referred to as an electrostatic latent image, is formed on a surface of an electrophotographic element comprising at least two layers: a photoconductive layer and an electrically conductive substrate. The electrostatic latent image can be formed by a variety of methods, for example, by imagewise radiation-induced discharge of a uniform potential previously formed on the surface. Typically, the electrostatic latent image is then developed into a toner image by contacting the latent image with an electrographic developer. If desired, the latent image can be transferred to another surface before development.

Among the many different kinds of photoconductive materials that have been employed in electrophotographic elements are phthalocyanine pigments such as titanyl phthalocyanine and titanyl tetrafluorophthalocyanines. Electrophotographic recording elements containing such pigments as charge-generation materials are useful in electrophotographic laser beam printers because of their capability for providing good photosensitivity in the near infrared region of the electromagnetic spectrum, that is, in the range of 700–900 nm.

Flocculation of organic pigment dispersions has been a recognized problem, especially in the paint and coating industry, for some time. For example, U.S. Pat. No. 3,589,924, in the names of Giambalvo, et al., describes improved non-crystallizing, non-flocculating phthalocyanine pigment compositions formed by mixing 60–95% of a crystallization-or flocculation-susceptible phthalocyanine pigment with about 5–40% of a sulfonated phthalimidomethyl phthalocyanine derivative. The mixture is prepared by the usual methods, e.g., acid pasting or salt grinding, for converting the phthalocyanine materials to pigmentary size. However techniques that are designed primarily to provide suitable pigments for paints and industrial coatings may not yield materials of sufficient purity or the appropriate crystallinity characteristics to meet the stringent requirements of electrophotographic applications, where high purity is very important for ensuring reliable performance. The crystalline form of the final pigment also has a profound influence on the performance of an electrophotographic element containing it.

In a photoconductive layer produced from a liquid coating composition that includes the titanyl phthalocyanine pigment and a solvent solution of polymeric binder, it is necessary that the titanyl phthalocyanine pigment be in a highly photoconductive form, either crystalline or amorphous, and in a sufficiently stable dispersion to permit its application as a very thin layer having high electrophotographic speed in the near infrared region.

A variety of methods have been used to produce suitable forms of titanyl phthalocyanine having differing crystallographic characteristics. U.S. Pat. No. 5,166,339 in the names of Duff, et al., presents a table of polymorphs of unsubstituted titanyl phthalocyanine in which materials bearing multiple designations are grouped as four types. Many phthalocyanine pigments are discussed in P. M. Borsenberger and D. S. Weiss, *Organic Photoreceptors for Imaging Systems*, Marcel Dekker, Inc., New York, pp. 338–391.

In one type of preparation, commonly referred to as "acid-pasting", crude titanyl phthalocyanine is dissolved in an acid solution, which is then diluted with a non-solvent to precipitate the titanyl phthalocyanine product. In another type of procedure, the crude titanyl phthalocyanine is milled, generally with particular milling media. Additionally, some preparations include a combination of techniques or modify a previously prepared titanyl phthalocyanine.

U.S. Pat. No. 5,132,197 in the names of Iuchi, et al., teaches a method in which titanyl phthalocyanine is acid pasted, treated with methanol, and milled with ether, monoterpene hydrocarbon, or liquid paraffin to produce a titanyl phthalocyanine having main peaks of the Bragg angle 2Θ with respect to X-rays of Cu Kα at 9.0°, 14.2°, 23.9°, and 27.1° (all +/−0.2°).

U.S. Pat. No. 5,206,359 in the names of Mayo, et al., teaches a process in which titanyl phthalocyanine produced by acid pasting is converted to type IV titanyl phthalocyanine from Type X by treatment with halobenzene.

U.S. Pat. No. 5,059,355 in the names of Ono, et al., teaches a process in which titanyl phthalocyanine is shaken with glass beads, producing an amorphous material having no substantial peaks detectable by X-ray diffraction. The amorphous material is stirred, with heating, in water and ortho-dichlorobenzene; methanol is added after cooling. A crystalline material having a distinct peak at 27.3° is produced.

U.S. Pat. No. 4,882,427 in the names of Enokida, et al., teaches a material having noncrystalline titanyl phthalocyanine and pseudo-non-crystalline titanyl phthalocyanine. The pseudo-noncrystalline material can be prepared by acid pasting or acid slurrying. The noncrystalline titanyl phthalocyanine can be prepared by acid pasting or acid slurrying followed by dry or wet milling, or by mechanical milling for a long time without chemical treatment.

U.S. Pat. No. 5,194,354 in the names of Takai, et al., teaches that amorphous titanyl phthalocyanine prepared by dry pulverization or acid pasting can be converted, by stirring in methanol, to a low crystalline titanyl phthalocyanine having strong peaks of the Bragg angle 2Θ with respect to X-rays of Cu Kα at 7.2°, 14.2°, 24.0°, and 27.2° (all +/−0.2°). It is stated that the low crystalline material can be treated with various organic solvents to produce crystalline materials: methyl cellosolve or ethylene glycol for material having strong peaks at 7.4°, 10.9°, and 17.9°; propylene glycol, 1,3-butanediol, or glycerine for material having strong peaks at 7.6°, 9.7°, 12.7°, 16.2°, and 26.4°; and aqueous mannitol solution for material having strong peaks at 8.5° and 10.2° (all peaks +/−0.2°).

U.S. Pat. Nos. 4,994,566 and 5,008,173 both in the names of Mimura, et al., teach a process in which non-crystalline particles produced by acid pasting or slurrying, followed by mechanical grinding or sublimation, are treated with tetrahydrofuran to produce a titanyl phthalocyanine having infrared absorption peaks at 1332, 1074, 962, and 783 cm$^{-1}$.

U.S. Pat. No. 5,039,586 in the name of Itami, teaches acid pasting, followed by milling in aromatic or haloaromatic solvent, with or without additional water or other solvents such as alcohols or ethers, at 20–100° C. In an example, crude titanyl phthalocyanine is milled with α-chloronaphthalene or ortho-dichlorobenzene as milling medium, followed by washing with acetone and methanol. The titanyl phthalocyanine produced has a first maximum intensity peak of the Bragg angle 2Θ with respect to X-rays of Cu Kα at a wavelength of 1.541 Å at 27.3°+/−0.2°, and a second maximum intensity peak at 6.8°+/−0.2°. This was contrasted with another titanyl phthalocyanine that is similarly milled, but not acid pasted. This material has a maximum peak at 27.3°+/−0.2° and a second maximum intensity peak at 7.5°+/−0.2°.

U.S. Pat. No. 5,055,368, in the names of Nguyen, et al., teaches a "salt-milling" procedure in which crude titanyl phthalocyanine is milled, first under moderate shearing conditions with milling media comprising inorganic salt and non-conducting particles. The milling is then continued at higher shear and temperatures up to 50° C., until the pigment undergoes a perceptible color change. Solvent is substantially absent during the milling steps.

U.S. Pat. No. 4,701,396 in the names of Hung, et al., teaches near infrared sensitive photoconductive elements made from fluorine-substituted titanylphthalocyanine pigments. While phthalocyanines having only fluorine substituents, and those being equal in number on each aromatic ring, are the preferred pigments of the invention described in that patent, various non-uniformly substituted phthalocyanines are taught.

U.S. Pat. No. 5,112,711 in the names of Nguyen, et al., teaches an electrophotographic element having a physical mixture of titanyl phthalocyanine crystals and titanyl fluorophthalocyanine crystals. The element provides a synergistic increase in photosensitivity in comparison to an expected additive combination of titanyl phthalocyanine and titanyl fluorophthalocyanine. Similar elements having physical mixtures combining titanyl phthalocyanine and chloro- or bromo-substituted titanyl phthalocyanine crystals produce results in which the photosensitivity is close to that of the least sensitive of the two phthalocyanines used.

U.S. Pat. Nos. 5,238,764 and 5,238,766, both in the names of Molaire, et al., teach that titanyl fluorophthalocyanine products of acid-pasting and salt-milling procedures, unlike unsubstituted titanyl phthalocyanine, suffer a significant reduction in near infrared sensitivity when they are dispersed in a solvent such as methanol or tetrahydrofuran, which has a gamma$_c$ hydrogen bonding parameter value greater than 9.0. These patents further teach that this reduction in sensitivity can be prevented by first contacting the titanyl fluorophthalocyanine with a material having a gamma$_c$ hydrogen bonding parameter of less than 8.0.

Molaire, et al., in U.S. Pat. No. 5,629,418, discloses a method for preparing titanyl fluorophthalocyanine that includes the steps of: dissolving titanyl fluorophthalocyanine in acid to form a solution; admixing the solution and water to precipitate out amorphous titanyl fluorophthalocyanine; washing the amorphous titanyl fluorophthalocyanine until substantially all of the acid is removed and contacting it with an organic solvent, which results in the conversion of the amorphous material to high crystallinity titanyl fluorophthalocyanine, the amorphous titanyl fluorophthalocyanine having been maintained in contact with water continuously from its precipitation to its conversion to a crystalline form.

In U.S. Pat. Nos. 5,614,342 and 5,766,810 both in the names of Molaire and Kaeding, disclose a method for preparing cocrystals of titanyl fluorophthalocyanine and unsubstituted titanyl phthalocyanine that includes the steps of: admixing crude titanyl phthalocyanine and crude titanyl fluorophthalocyanine to provide an amorphous pigment mixture, as determined by X-ray crystallography using X-radiation characteristic of Cu Kα at a wavelength of 1.541 Å of the Bragg angle 2Θ; contacting the amorphous pigment mixture with an organic solvent having a gamma$_c$ hydrogen bonding parameter of less than 8:0; and, prior to contacting, substantially excluding the amorphous pigment mixture from contact with an organic solvent having a gamma$_c$ hydrogen bonding parameter greater than 9.0. The amorphization step must be substantially complete so as to break the large primary particles of the starting crude pigments and thereby lower the average particle size of the final cocrystalline mixture. Substantially complete amorphization of the crude pigments is also necessary to prevent degradation of the dark decay characteristics of the final cocrystal; small amounts of crude pigments having inherently high dark decay that are not amorphized would not be affected by the subsequent solvent treatment and therefore would retain their high dark decay characteristics, causing degradation of the dark decay property of the final cocrystalline product.

Molaire, et al., in U.S. Pat. No. 5,523,189, discloses an electrophotographic element including a charge generation layer that includes a binder in which is dispersed a physical mixture of a high speed titanyl fluorophthalocyanine having a first intensity peak with respect to X-rays characteristic of Cu Kα at a wavelength of 1.541 Å of the Bragg angle 2Θ at 27°±0.2°, and a second intensity peak at 7.3°±0.2°, the second peak having an intensity relative to the first peak of less than 60 percent; and a low speed titanyl fluorophthalocyanine having a first intensity peak with respect to X-rays characteristic of Cu Kα at a wavelength of 1.541 Å of the Bragg angle 2Θ at 6.7°±0.2°, and a second intensity peak at 23°±0.2°, the second peak having an intensity relative to the first peak of less than 50 percent.

Molaire, et al., in U.S. Pat. No. 5,773,181, discloses a method for preparing a phthalocyanine composition including the steps of: synthesizing a crystalline product comprising a mixture of five different unsubstituted or fluorosubstituted phthalocyanines, wherein a central M moiety bonded to the four inner nitrogen atoms of the phthalocyanine nuclei represents a pair of hydrogen atoms or a covalent or coordinate bonded moiety, including an atom selected from the group consisting of Li, Na, K, Be, Mg, Ca, Ba, Sc, Y, La, Ac, Ti, Zr, Hf, V, Nb, Cr, Mo, W, Mn, Tc, Re, Fe, Ru, Os, Co, Rh, Ir, Ni, Pd, Pt, Cu, Ag, Au, Zn, Cd, Hg, Al, Ga, In, Tl, Si, Ge, Sn, Pb, As, and Sb, with M preferably representing Ti=O; increasing the amorphous character of the mixture of phthalocyanines as determined by X-ray crystallography using X-radiation characteristic of Cu Kα at a wavelength of 1.541 Å of the Bragg angle 2Θ to provide an amorphous pigment mixture; contacting the amorphous pigment mixture with organic solvent having a $gamma_c$ hydrogen bonding parameter of less than 8.0; and prior to the contacting, substantially excluding the amorphous pigment mixture from contact with organic solvent having a $gamma_c$ hydrogen bonding parameter greater than 9.0.

The procedures for the preparation of titanyl phthalocyanine pigments described in the foregoing patents, all of whose disclosures are incorporated herein by reference, suffer from various deficiencies and disadvantages. For example, the use of acid presents a shortcoming for both environmental and safety concerns, particularly in commercial scale procedures. Also, salt milling avoids the use of acid but requires extensive washing of the milled material to remove salts, which can otherwise cause high dark decay in a photoconductor.

Procedures that first contact the titanyl fluorophthalocyanine with a solvent such as methanol or tetrahydrofuran that has a $gamma_c$ hydrogen bonding parameter value greater than 9.0 cause a significant reduction in near infrared sensitivity. The preparation of titanyl fluorophthalocyanine having good photogeneration characteristics is expensive. It would be desirable to be able to produce a crystalline titanyl phthalocyanine composition that has good photogeneration characteristics when used in an electrophotographic element but is less expensive than titanyl fluorophthalocyanine. A suitable procedure would avoid deleterious contact with high $gamma_c$ hydrogen bonding parameter solvents and also not require the use of acid or of salt milling media.

Because of environmental concerns regarding the use of certain solvents such as chlorinated hydrocarbons, i.e., dichloromethane and trichloroethane, it would be desirable to form photoconductive layers from coating compositions containing nonchlorinated solvents such as acetone, tetrahydrofuran (THF), methyl ethyl ketone (MEK), methyl isobutyl ketone (MIBK), cyclohexanone, and alcohols, including methanol, ethanol, isopropanol, butanol, and 2-ethoxyethanol. The present inventors have found, however, that the cocrystalline mixtures described in the above-discussed U.S. Pat. Nos. 5,614,342 and 5,766,810 are difficult to disperse in non-chlorinated solvents and have further found that the dispersions using the non-chlorinated solvents tend to be unstable toward flocculation.

After considerable investigation and experimentation, the present inventors have discovered a process for producing cocrystals of titanyl fluorophthalocyanines, abbreviated herein as "TiFOPc", and unsubstituted titanyl phthalocyanine, abbreviated herein as "TiOPc", that can be monodispersed into nanoparticles without the use of chlorinated solvents or of binder materials. Furthermore, the inventors have found that electrophotographic performance such as sensitivity can be improved by the process of their invention.

SUMMARY OF THE INVENTION

The present invention is directed to a process for forming a self-dispersing crystalline phthalocyanine pigment composition of monodisperse nanoparticles by: dry milling a mixture comprising titanyl fluorophthalocyanines, unsubstituted titanyl phthalocyanine, and an organic monomeric dispersant but substantially free of organic solvents or inorganic salts, thereby forming a substantially amorphous phthalocyanine pigment composition. The process further includes treating the substantially amorphous composition with an organic solvent having a hydrogen bonding parameter $gamma_c$ lower than about 8, thereby forming a self-dispersing cocrystalline phthalocyanine pigment composition of monodisperse nanoparticles comprising titanyl fluorophthalocyanines and titanyl phthalocyanine.

Further, in accordance with the present invention, an electrophotographic element includes a charge generation layer that includes the described cocrystalline phthalocyanine pigment composition.

DETAILED DESCRIPTION OF THE INVENTION

Unsubstituted titanyl phthalocyanine (TiOPc) has the following structural formula:

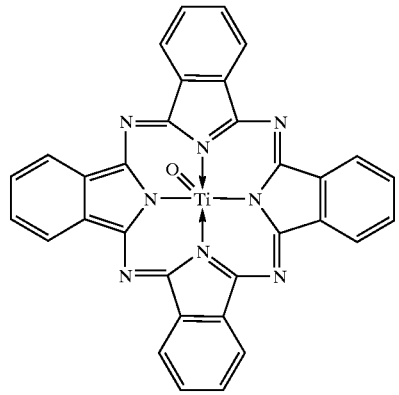

Titanyl fluorophthalocyanines (TiFOPc) have the following structural formula:

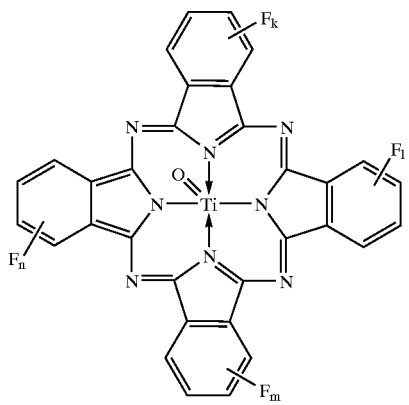

wherein each of k, l, m, and n is independently an integer from 1 to 4. In a particular embodiment of the invention, the crystalline titanyl fluorophthalocyanine is a mixture comprising titanyl 2,9,16,23-tetrafluorophthalocyanine, titanyl 2,9,16-trifluorophthalocyanine, titanyl 2-fluorophthalocyanine, titanyl 2,9-difluorophthalocyanine, and titanyl 2,16-difluorophthalocyanine.

In accordance with the present invention, a mixture substantially free of organic solvents or inorganic salts and including titanyl phthalocyanine, titanyl fluorophthalocyanines, and an organic monomeric dispersant is dry milled to form a substantially amorphous phthalocyanine pigment composition. The milled substantially amorphous titanyl phthalocyanine mixture so obtained is transformed into a self-dispersing crystalline phthalocyanine pigment composition of monodisperse nanoparticles including titanyl phthalocyanine and titanyl fluorophthalocyanines and by contact with an organic solvent having a hydrogen bonding parameter gamma$_c$ lower than about 8.

The organic monomeric dispersants materials of the invention are all prepared by melt phase reactions of the appropriate diacid or diester, with a selected straight or branched chain alcohol or amine. A tin-containing catalyst is added to facilitate the esterification of a diacid by an alcohol. A transition metal(Sn, Zn, Ti) catalyst is employed to facilitate ester interchange between the dimethyl ester of the diacid and the selected alcohol. The amount of catalyst employed depends on the particular reactants and can vary from 50 ppm up to 0.2 wt. %; the catalyst is not removed from the resulting product, which is allowed to cool to room temperature, removed from the reaction vessel, and submitted without further purification for analytical assay and dispersant evaluation. The structural variants can be prepared by well known melt phase reaction techniques, as described, for example, in Sorenson and Campbell, *Preparative Methods of Polymer Chemistry*, 2nd. Ed., p. 132, Interscience Publishers, 1968.

Milling generates increased pigment surface area, while thermodynamic forces act to minimize surface area. The dispersant serves to stabilize the new surface area of the milled pigment, which may be accomplished by steric and/or charge stabilization. The solubility of the monomeric dispersant is an important variable in determining the adsorption of the dispersant on the newly generated pigment surface.

In accordance with the present invention, the organic monomeric dispersants are preferably diesters or diamides of isophthalic acid or of iminobissulfonyl-m-benzoic acid. More preferably, the dispersant structures include an ionic moiety such as a sulfo or an iminobis-sulfonyl group.

One useful group of monomeric dispersants is represented by the following general structure:

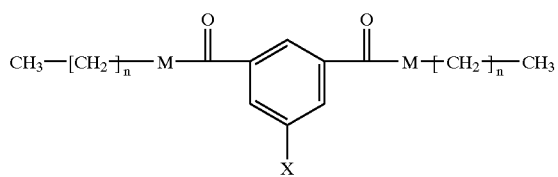

Monomeric Dispersant Formula 1 where X represents H, t-Bu, OH, NO$_2$, an alkyl group containing up to about 6 carbon atoms, SO$_3$Na, SO$_3$Li, or SO$_3$P(phenyl)$_3$CH$_3$; M represents NH or O when n is an integer from 1 through 40; and M represents OH when n is 0.

The structures of examples of monomeric dispersants of Formula 1 are shown in TABLE 1 following:

TABLE 1

| Dispersant | M | N | X | Tc, °C. | Tm, °C. |
|---|---|---|---|---|---|
| 1-A | O | 7 | SO$_3$Na | — | — |
| 1-B | O | 9 | SO$_3$Na | 32.5 | 33.6 |
| 1-C | O | 11 | SO$_3$Na | 23.2 | 25.7 |
| 1-D | O | 17 | SO$_3$Na | 77.4 | 56 |
| 1-E | O | 11 | SO$_3$P(Ph)$_3$CH$_3$ | 35 | 22.8 |
| 1-F | O | 11 | SO$_3$Li | 25.2 | 27.9 |
| 1-G | O | 11 | t-Bu | 2.4 | 36.9 |
| 1-H | O | 11 | H | −7.1 | 21 |
| 1-I | O | 17 | OH | — | — |
| 1-J | NH | 17 | SO$_3$Na | 32.8 | 43.5 |
| 1-K | NH | 11 | SO$_3$Na | — | — |
| 1-L | NH | 17 | —H | 104.4 | 127.9 |
| 1-M | NH | 17 | t-Bu | 21.5 | 39.4 |
| 1-N | NH | 17 | SO$_3$Li | 49.8 | 43.4 |
| 1-O | NH | 17 | SO$_3$P(Ph)$_3$CH$_3$ | — | — |

A second group of monomeric dispersants useful for the present invention is represented by the following general structure:

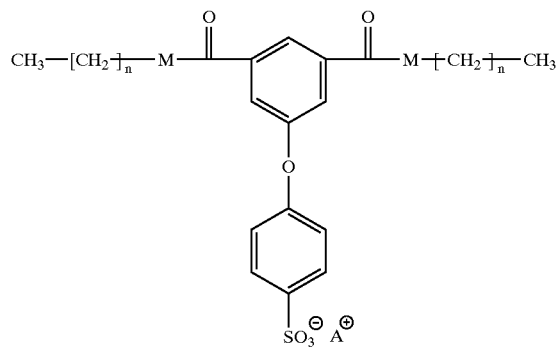

Monomeric Dispersant Formula 2 where A$^+$ represents Na$^+$, K$^+$, Li$^+$, or P(phenyl)$_3$R$^+$; M represents NH or O; and n is an integer from 1 through 40.

The structures of examples of monomeric dispersants of Formula 2 are shown in TABLE 2 following:

TABLE 2

| Dispersant | M | A$^+$ | N | Tc, °C. | Tm, °C. |
|---|---|---|---|---|---|
| 2-A | O | Na$^+$ | 7 | — | — |
| 2-B | O | Na$^+$ | 11 | — | — |
| 2-C | O | Na$^+$ | 17 | 42 | 53 |
| 2-D | O | Na$^+$ | 21 | 63 | 68 |
| 2-E | NH | Na$^+$ | 7 | — | — |
| 2-F | NH | Na$^+$ | 11 | — | — |
| G-2 | NH | Na$^+$ | 17 | 31 | 42 |

A third group of suitable monomeric dispersants useful for the present invention includes imino-bis-sulfonyl compounds, represented by the following general structure:

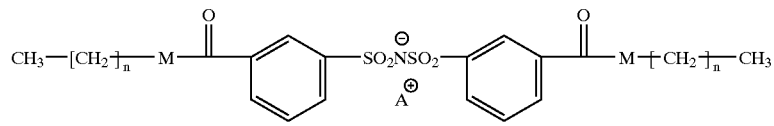

Monomeric Dispersant Formula 3 where $A^+$ represents $Li^+$, $Na^+$, $K^+$, or $P(phenyl)_3R^+$; M represents NH or O; and n is an integer from 1 through 40.

The structures of examples of monomeric dispersants of Formula 3 are shown in TABLE 3 following:

TABLE 3

| Dispersant | M | $A^+$ | n | Tc, ° C. | Tm, ° C. |
|---|---|---|---|---|---|
| 3-A | O | $Na^+$ | 11 | 105 | 110 |
| 3-B | O | $Na^+$ | 17 | 31 | 32 |
| 3-C | O | $Na^+$ | 21 | — | — |
| 3-D | O | $Na^+$ | 8 | — | — |
| 3-E | NH | $Na^+$ | 17 | 48 | 49 |
| 3-F | NH | $Na^+$ | 11 | — | — |
| 3-G | NH | $Na^+$ | 7 | — | — |

A fourth group of suitable monomeric dispersants useful for the present invention is represented by the following general structure:

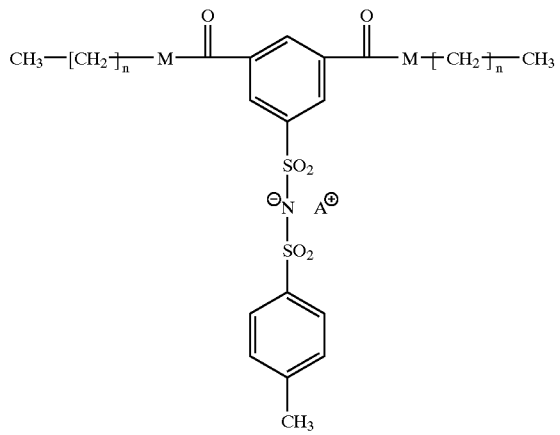

Monomeric Dispersant Formula 4 where $A^+$ represents $Li^+$, $Na^+$, $K^+$, or $P(phenyl)_3R^+$; M represents NH or O; and n is an integer from 1 through 40.

The structures of examples of monomeric dispersants of Formula 4 are shown in TABLE 4 following:

TABLE 4

| Dispersant | M | $A^+$ | n | Tc, ° C. | Tm, ° C. |
|---|---|---|---|---|---|
| 4-A | NH | $K^+$ | 7 | — | — |
| 4-B | NH | $K^+$ | 11 | — | 68 |
| 4-C | NH | $K^+$ | 17 | 26 | 40 |
| 4-D | NH | $K^+$ | 21 | 41 | 63 |
| 4-E | O | $K^+$ | 7 | — | — |
| 4-F | O | $K^+$ | 11 | — | — |
| 4-G | O | $K^+$ | 17 | 31 | 42 |
| 4-H | O | $K^+$ | 21 | 39 | 52 |

Crystallographic characteristics discussed herein are based upon X-ray diffraction spectra at the Bragg angle 2Θ, using Cu Kα X-radiation at a wavelength of 1.541 Å and are +/−0.2° unless otherwise indicated. Suitable X-ray diffraction techniques are described in, for example, T. S. Hutchinson and D. C. Baird, *Engineering Solids*, John Wiley and Sons, Inc., 1963, and *X-ray Diffraction Procedures for Polycrystalline and Amorphous Materials*, 2nd Ed., John Wiley and Sons, Inc., 1974.

The composition of the mixtures and their electrophotographic properties can be manipulated through varying the weight ratio of the fluorophthalocyanines. Unpredictably, the cocrystal of the phthalocyanine mixtures of this invention have a distinct crystallogram exhibiting major peaks of the Bragg angle 2Θ with respect to X-rays of Cu Kα at a wavelength of 1.541 Å at 7.4°, 10.1°, 12.7°, 13.2°, 14.9° 15.9°, 17.4°, 18.6°, 22.4°, 24.3°, 25.6°, 28.8° (all +/0.2°) for a wide range of weight ratios of the starting phthalocyanines. More unpredictably, these inventors have found that, the distinct crystallogram of this invention looks more like the crystallogram obtained when the pure unsubstituted titanyl phthalocyanine is dry milled and treated with an hydrogen bonding parameter $gamma_c$ less than 9, preferably less than 8. However the pigment so obtained exhibits substantially improved electrophotographic sensitivity over either the titanyl fluorophthalocyanine or the unsubstituted titanyl phthalocyanine, subjected to the same process.

Electrophotographic elements incorporating those compositions that exhibit improved photosensitivity over similarly treated phthalocyanines containing only fluorine substituents.

$Gamma_c$ hydrogen bonding parameter values of organic solvents can be determined by the method of Crowley, Teague, and Lowe, "A Three-Dimensional Approach to Solubility" in *Journal of Paint Technology*, Vol. 38, No. 496, May 1966, pp. 269–280, and further described in CRC Handbook of Solubility Parameters and Other Cohesion Parameters, A. Barton, CRC Press, Boca Raton, Fla., 1983, pp. 174 and 179–180, and in the ASTM D3132 standard test method. The method includes measuring the effect of the solvent on deuterated methanol in terms of the frequency of the infrared radiation absorbed by the O-D bond of deuterated methanol and comparing that effect to the effect of benzene on the same bond. The value of the $gamma_c$ hydrogen bonding parameter for the solvent being tested is then determined in accordance with the equation $$gamma_c = [(nu_{benzene}) - (nu_{solvent})]/10$$

wherein "nu$_{benzene}$" is the wave number, expressed as cm$^{-1}$, of the infrared radiation absorbed by the O-D bond of deuterated methanol in contact with benzene, and "nu$_{solvent}$" is the wave number of the infrared radiation absorbed by the O-D bond of deuterated methanol in contact with the solvent being tested.

Gamma$_c$ hydrogen bonding parameter values of numerous well known organic solvents have been determined. A list of some of such solvents and values is presented in TABLE 5.

TABLE 5

| Solvent | Gamma$_c$ hydrogen bonding parameter value |
| --- | --- |
| benzene | 0.0 |
| dichloromethane | 1.5 |
| 1,1,2-trichloroethane | 1.5 |
| chlorobenzene | 1.5 |
| dichloropropane | 1.5 |
| chloroform | 1.5 |
| ethylene dichloride | 1.5 |
| toluene | 4.5 |
| xylene | 4.5 |
| acetonitrile | 6.3 |
| methyl benzoate | 6.3 |
| anisole | 7.0 |
| diethyl ketone | 7.7 |
| methyl ethyl ketone | 7.7 |
| methyl isobutyl ketone | 7.7 |
| acetone | 9.7 |
| butyrolactone | 9.7 |
| dioxane | 9.7 |
| tetrahydrofuran | 9.9 |
| cyclohexanone | 11.7 |
| N,N-dimethylformamide | 11.7 |
| 2-ethoxyethanol | 13.0 |
| ethanol | 18.7 |
| methanol | 18.7 |
| butanol | 18.7 |
| pyridine | 18.1 |
| ethylene glycol | 20.6 |

To form the cocrystalline pigment composition of the invention by treatment of the substantially amorphous pigment with an organic solvent having a gamma$_c$ hydrogen bonding parameter value less than 9, any convenient procedure can be used. For example, the pigment can be contacted with vapors of the solvent, or it can be simply mixed well with the liquid solvent, or it can be milled in mixture with the solvent and typical milling media, such as, e.g., steel shot.

The invention has been described in detail for the purpose of illustration, but it is understood that such detail is solely for that purpose, and variations can be made therein by those skilled in the art without departing from the spirit and scope of the invention, which is defined by the following claims.

What is claimed is:

1. A process for forming a titanyl phthalocyanine pigment composition useful as electrophotographic charge generation materials, said process comprising:

dry milling a mixture substantially free of organic solvents and inorganic salts and comprising titanyl phthalocyanine, titanyl fluorophthalocyanines, and a monomeric organic dispersant, thereby forming a substantially amorphous phthalocyanine pigment composition.

2. The process of claim 1, wherein said monomeric organic dispersant is selected from the group consisting of diesters of isophthalic acid, diamides of isophthalic acid, diesters of iminobis-sulfonyl-m-benzoic acid, and diamides of iminobis-sulfonyl-m-benzoic acid.

3. The process of claim 2, wherein said monomeric organic dispersant includes a sulfo or an iminobis-sulfonyl ionic moiety.

4. The process of claim 2, wherein said organic dispersant has the structure

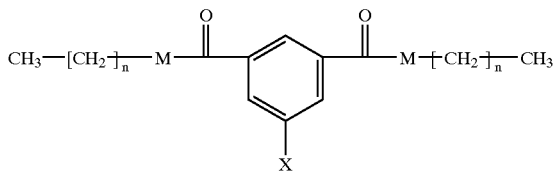

wherein X represents H, t-Bu, OH, NO$_2$, an alkyl group containing up to about 6 carbon atoms, SO$_3$Na, SO$_3$Li, or SO$_3$P(phenyl)$_3$CH$_3$; M represents NH or O when n is an integer from 1 through 40; and M represents OH when n is 0.

5. The process of claim 4, wherein X is SO$_3$Na or SO$_3$Li.

6. The process of claim 4, wherein n is an integer from 7 to 21.

7. The process of claim 2, wherein said organic dispersant has the structure

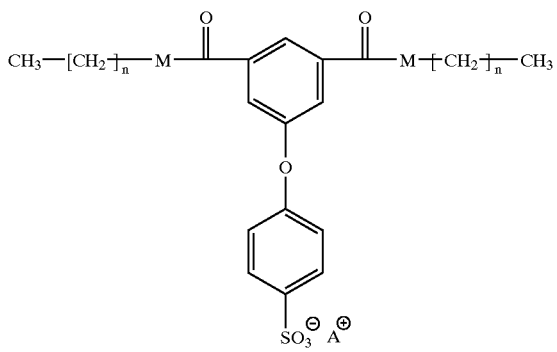

wherein A$^+$ represents Na$^+$, K$^+$, Li$^+$, or P(phenyl)$_3$R$^+$; M represents NH or O; and n is an integer from 1 through 40.

8. The process of claim 7, wherein n is an integer from 7 to 21.

9. The process of claim 2, wherein said organic dispersant has the structure

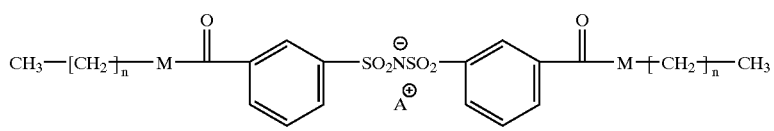

wherein A⁺ represents Li⁺, Na⁺, K⁺, or P(phenyl)₃R⁺; M represents NH or O; and n is an integer from 1 through 40.

10. The process of claim 9, wherein n is an integer from 7 to 21.

11. The process of claim 2, wherein said organic dispersant has the structure

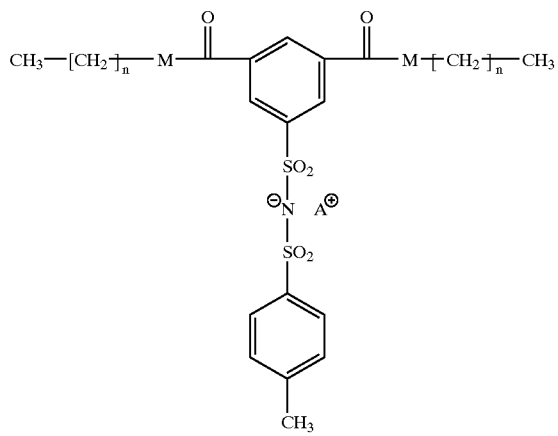

wherein A⁺ represents Li⁺, Na⁺, K⁺, or P(phenyl)₃R⁺; M represents NH or O; and n is an integer from 1 through 40.

12. The process of claim 11, wherein n is an integer from 7 to 21.

13. The process of claim 1, further comprising:
contacting said substantially amorphous composition with an organic solvent having a hydrogen bonding parameter gamma lower than about 9, thereby forming a self-dispersing cocrystalline phthalocyanine pigment composition comprising titanyl fluorophthalocyanines and titanyl phthalocyanine.

14. The process of claim 13, wherein said contacting is carried out by wet milling.

15. The process of claim 13, wherein said organic solvent has a hydrogen bonding parameter gamma$_c$ lower than about 8.

16. The process of claim 15, wherein said organic solvent is dichloromethane.

17. An electrophotographic charge generation layer comprising a self-dispersing cocrystalline phthalocyanine pigment composition formed by the process of claim 13.

* * * * *